United States Patent
Knebel

(10) Patent No.: US 8,339,703 B2
(45) Date of Patent: Dec. 25, 2012

(54) SCANNING MICROSCOPE AND METHOD FOR MANIPULATING SAMPLES BY MEANS OF A MANIPULATING LIGHT BEAM IN A SCANNING MICROSCOPE

(75) Inventor: Werner Knebel, Kronau (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 146 days.

(21) Appl. No.: 12/088,416

(22) PCT Filed: Sep. 27, 2006

(86) PCT No.: PCT/EP2006/066782
§ 371 (c)(1),
(2), (4) Date: Oct. 21, 2008

(87) PCT Pub. No.: WO2007/036531
PCT Pub. Date: Apr. 5, 2007

(65) Prior Publication Data
US 2009/0073555 A1 Mar. 19, 2009

(30) Foreign Application Priority Data
Sep. 29, 2005 (DE) .................... 10 2005 046 638

(51) Int. Cl.
*G02B 21/06* (2006.01)
(52) U.S. Cl. ........................ 359/385; 359/368
(58) Field of Classification Search ........... 359/368–390
See application file for complete search history.

(56) References Cited

U.S. PATENT DOCUMENTS

| 6,094,300 A | 7/2000 | Kashima et al. |
| 6,677,566 B2 | 1/2004 | Knebel et al. |
| 6,850,363 B1 | 2/2005 | Wendenburg et al. |
| 7,283,297 B2 | 10/2007 | Knebel et al. |
| 7,551,351 B2 * | 6/2009 | Ulrich et al. .................. 359/388 |
| 2003/0197924 A1 | 10/2003 | Nakata |

FOREIGN PATENT DOCUMENTS

| DE | 19954933 | 5/2001 |
| DE | 100 39 520 A1 | 2/2002 |
| DE | 10233549 | 2/2004 |
| DE | 10247249 | 4/2004 |
| DE | 102004011770 | 10/2005 |
| JP | 06160724 | 6/1994 |

OTHER PUBLICATIONS

Kevin Braeckmans et al., "Three-Dimensional Fluorescence Recovery after Photobleaching with the Confocal Scanning Laser Microscope", Biophysical Journal, New York, US, US, vol. 85, Oct. 2003, pp. 2240-2252, XP002346209.

* cited by examiner

*Primary Examiner* — Thong Nguyen
(74) *Attorney, Agent, or Firm* — Leydig, Voit & Mayer, Ltd.

(57) ABSTRACT

A scanning microscope for manipulating a sample, the microscope, having a first light source, a second light source, a beam deflector, and an optical device. The first light source is configured to emit an illuminating light beam that follows an illuminating beam. A second light source is configured to produce a manipulating light beam which has a manipulating beam focus and follows a manipulating beam path. The beam deflection device is configured to guide the illuminating light beam and the manipulating beam focus over or through the sample. The optical device is disposed downstream of the second light in the manipulating beam and is configured to modify the size of the manipulating beam focus.

12 Claims, 3 Drawing Sheets

SCANNING MICROSCOPE AND METHOD FOR MANIPULATING SAMPLES BY MEANS OF A MANIPULATING LIGHT BEAM IN A SCANNING MICROSCOPE

CROSS REFERENCE TO PRIOR APPLICATION

This is a U.S. national phase application under 35 U.S.C. §371 of International Patent Application No. PCT/EP2006/066782, filed Sep. 27, 2006, and claims benefit of German Patent Application No. 10 2005 046 638.9, filed Sep. 29, 2005, which is incorporated by reference herein. The International Application was published in German on Apr. 5, 2007 as WO 2007/036531 A1 under PCT Article 21(2).

FIELD

The invention relates to a scanning microscope and in particular scanning microscope for manipulating samples with a manipulating light beam.

BACKGROUND

German patent application DE 102 33 549 describes a scanning microscope with a light source which, in order to illuminate a sample, emits an illuminating light beam which travels along an illuminating beam path and can be guided over or through the sample by a beam deflection device. A detector receives the detection light which emanates from the sample and travels along a detection light beam path. A further light source produces a manipulating light beam which travels along a manipulating beam path. The manipulation light beam can also be guided over or through the sample by the beam deflection device.

German laid-open patent application DE 199 54 933 describes an arrangement for coupling at least one beam of optical tweezers for capturing particles and/or a processing beam into a microscope beam path, preferably in a laser scanning microscope. Means are provided to freely change the location of the beam focus of the optical tweezers and/or the processing beam with respect to the change of the focal position of the microscope.

U.S. Pat. No. 6,094,300 describes a laser scanning microscope which has two scanning devices. In this case, the illuminating beam is guided by one scanning device, while a further illuminating beam or manipulating light beam is guided, for example, by the other scanning device. The light beams coming from the two scanning devices are brought together in such a manner that they are incident in unison on a point of the sample. However, this arrangement is difficult to manipulate.

The aforementioned devices have the disadvantage that if areas of a sample which are larger than the focus of the illuminating light beam are to be manipulated, these areas have to be scanned by the manipulating beam. This is awkward and time consuming and makes it impossible to investigate fast processes.

SUMMARY

In accordance with an aspect of the present invention a scanning microscope is provided. The scanning microscope includes a first light source that emits an illuminating light beam which travels along an illuminating beam path. A second light source configured to produce a manipulating light beam which has a manipulating beam focus and travels along a manipulating beam path. A beam deflection device is configured to guide the illuminating light beam and manipulating beam focus over or through a sample. The scanning microscope further includes an optical device disposed downstream of the second light source in the manipulating beam path that is configured to modify size of the manipulating beam focus.

BRIEF DESCRIPTION OF THE DRAWINGS

Subject matter of the invention is illustrated schematically in the drawings and is described in the following with reference to the figures, in which.

DETAILED DESCRIPTION

Figure 1:
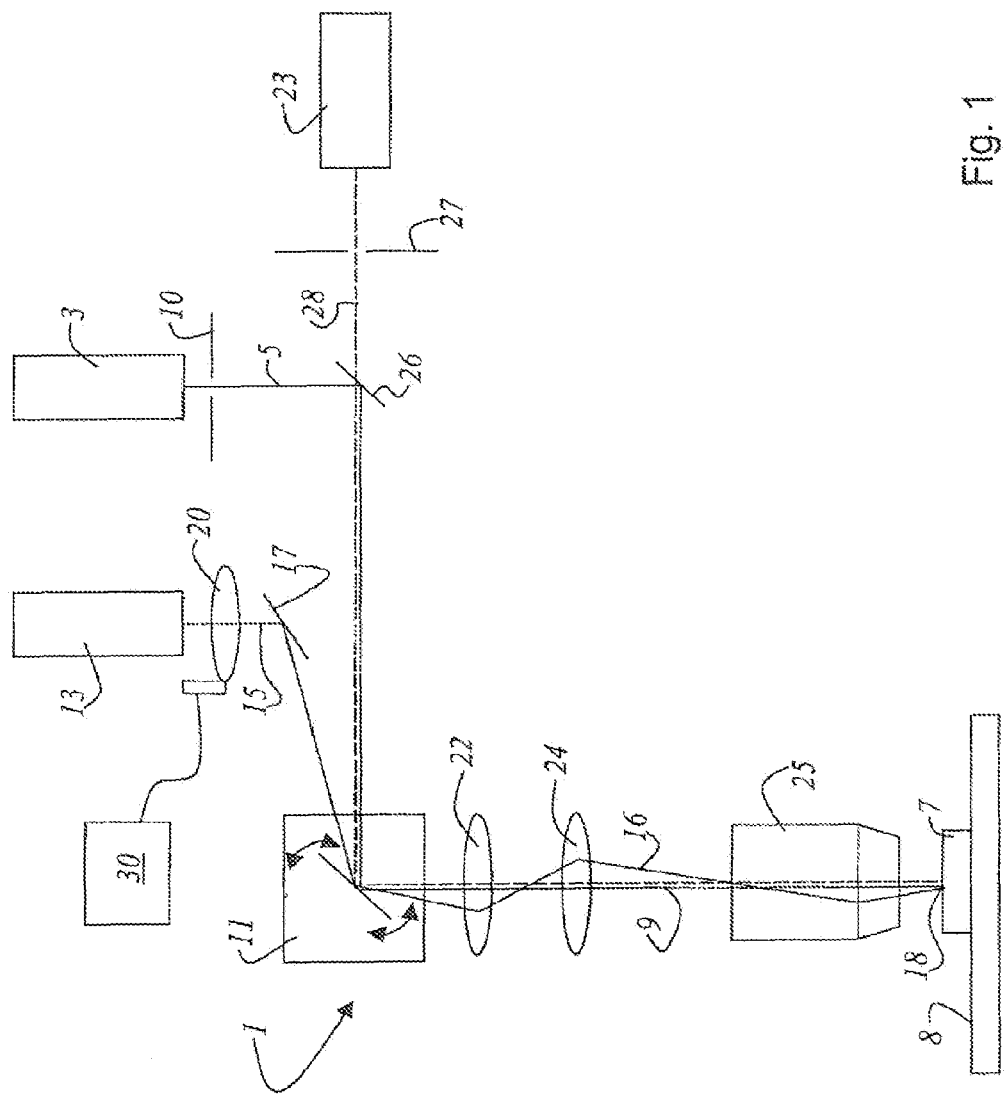
FIG. 1 shows a schematic illustration of a first embodiment of the scanning microscope as claimed in the present invention.

The invention relates to a scanning microscope. In one embodiment, the invention relates to a scanning microscope comprising a light source which, in order to illuminate a sample, emits an illuminating light beam which travels along an illuminating beam path and can be guided over or through the sample by a beam deflection device. Furthermore, the scanning microscope can be provided with a further light source, which produces a manipulating light beam which travels along a manipulating beam path. The manipulating light beam forms a manipulating beam focus, which can also be guided over or through the sample by the beam deflection device.

Furthermore, in an embodiment, the invention relates to a method for manipulating samples with a manipulating light beam in a scanning microscope. For example, the invention relates to a method for manipulating a sample with a manipulating light beam in a scanning microscope, in order to illuminate a sample a light source emitting an illuminating light beam which travels along an illuminating beam path and is guided over or through the sample by a beam deflection device. A further light source produces a manipulating light beam which travels along a manipulating beam path and has formed a manipulating beam focus which is also guided over or through the sample by the beam deflection device.

In accordance with one aspect of a scanning microscope according to the present invention, it is possible to change the size and position of the manipulating light beam in a simple manner. This can be achieved by a scanning microscope comprising the features discussed below.

In accordance with a further aspect of the present invention, it is also an object of the invention to create a method with which the size and position of the focus of a manipulating light beam can be changed in a simple manner.

This can be achieved by a process discussed below.

In accordance with one aspect of the present invention, an optical means can be placed downstream of the further light source in the manipulating light beam with which the size of the manipulating beam focus can be changed. In this case, the optical means can be a zoom optics or a diaphragm arrangement.

In accordance with a further one aspect of the present invention the optical means can be is connected to a control unit which permits the size of the manipulating beam focus to be changed as a function of time.

In yet a further embodiment, the method for manipulating samples with a manipulating light beam in a scanning microscope, an optical means can be placed downstream of the further light source in the manipulating light beam with which the size of the manipulating beam focus can be changed.

There can be a plurality of modes with which the manipulating light beam can be changed. First, assuming a fixed position of the manipulating light beam, the size of the manipulating beam focus on the sample is increased at least once. A further possibility is that, again assuming a fixed position of the manipulation light beam on the sample, the size of the manipulating light beam focus is decreased at least once. Finally, it is possible that the position of the manipulating light beam on the sample is changed in such a way that the individual manipulating beam foci at least partly overlap.

The size and position of the manipulating beam focus can be controlled as desired as a function of time with the control unit which is connected to the optical means.

FIG. 1 shows a scanning microscope 1 which is provided with a light source 3. The light source 3 emits an illuminating light beam 5 which is provided for illuminating a sample 7 which is at least fixed on an X-Y table 8. An illuminating pinhole 10 is placed downstream of the light source 3. The illuminating beam path 9 can be guided over or through the sample 7 by a beam deflection device 11. A further light source 13 is provided which emits a manipulating light beam 15 which travels along a manipulating beam path 16. The manipulating light beam 15 is aimed onto the beam deflection device 11 by means of a deflecting element 17. The manipulating light beam 15 and the illuminating light beam 5 coincide at a location in the beam deflection device 11. The manipulating beam path 16 and the illuminating beam path 9 run over a scanning optics 22 and a tube optics 24 and are finally imaged onto the sample 7 by the objective 25 of the scanning microscope 1. The manipulating light beam 15 has a manipulating light beam focus 18 on the sample 7. The detection light 28 emanating from the sample 7 passes through a dichroic beam splitter 26 and a detection pinhole 27 arranged in front of a detector 23. The optical means 20 is connected to a control unit 30 by which the change in the size of the manipulating beam focus 18 as a function of time is achieved. In the embodiment described here, the optical means is represented as a zoom optics.

Figure 2:
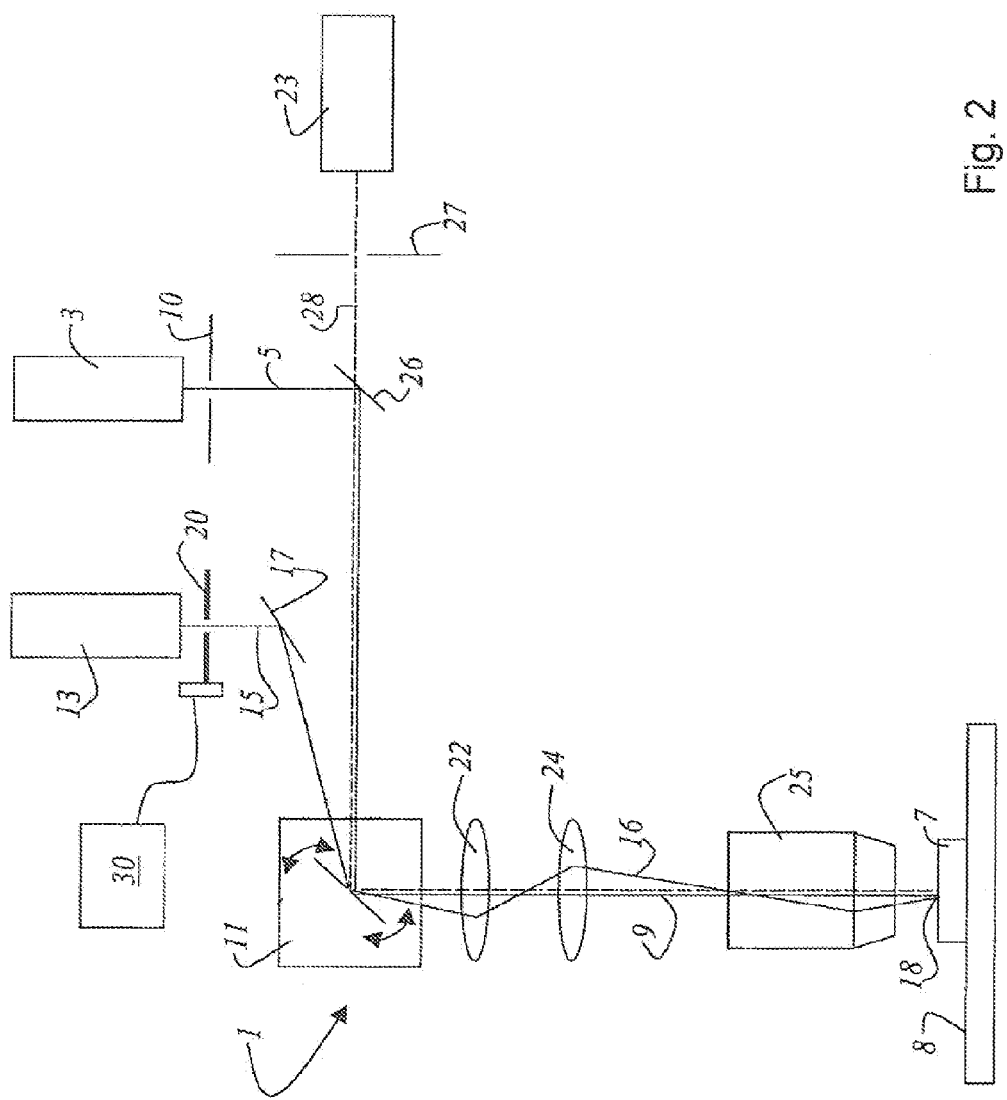
FIG. 2 shows a schematic illustration of a further embodiment of the scanning microscope as claimed in the present invention.

FIG. 2 shows a further embodiment of the scanning microscope 1 as claimed in the invention. With the exception of the optical means 20, the construction of the scanning microscope 1 is identical to the construction illustrated in FIG. 1. The optical means 20 in FIG. 2 is a diaphragm, for example an iris diaphragm, with which the diameter of the manipulating light beam can be changed. As already described in FIG. 1, the change in the diameter of the manipulating light beam can be performed manually or by a control unit 30.

Figure 3B:
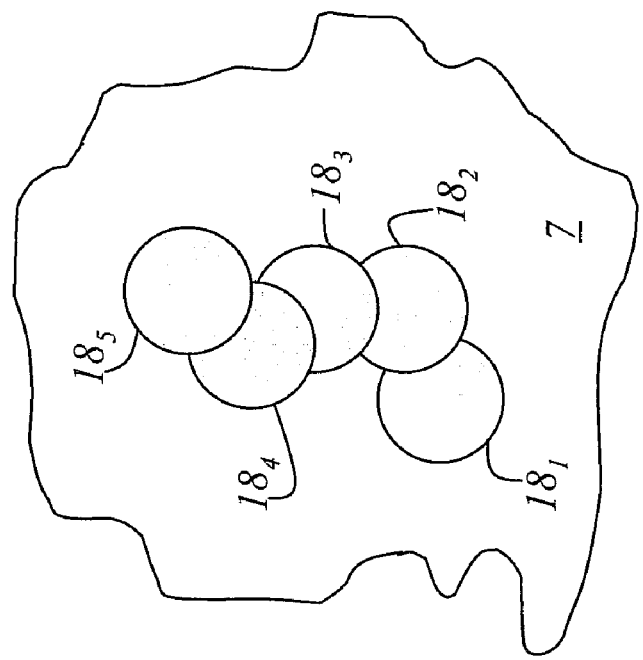
FIG. 3b shows a second embodiment with which the position of the focus of the manipulating light beam is changed on the sample.
Figure 3A:
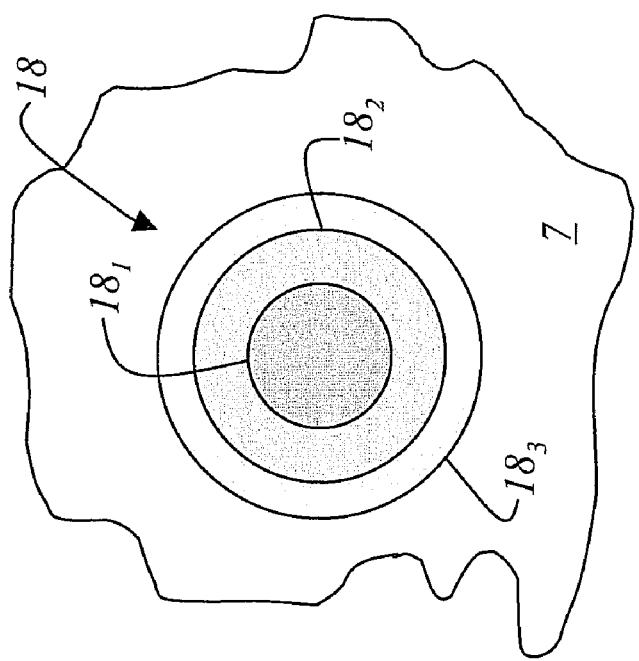
FIG. 3a shows a schematic illustration of a first mode with which the focus of the manipulating light beam is changed on the sample.

FIG. 3a shows the change in the manipulating beam focus 18 in the case of a fixed position. First, a start is made with a first focus $18_1$ which has a specific diameter. After a certain time, the diameter of the of focus is increased and a second manipulating beam focus $18_2$ is obtained which has a larger diameter than the first manipulating beam focus $18_1$. After some further time, a switch is made to a third manipulating light beam focus $18_3$ which, again, has an even larger diameter than the second manipulating beam focus $18_2$. Even though the illustration in FIG. 3a shows three manipulating beam foci which differ in terms of their size, but not in terms of their position, this should not be seen as a restriction of the invention. It would be clear to one of ordinary skill in the art, that this effect can be achieved with at least three manipulating beam foci which differ in terms of their size. By changing the size of the manipulating beam focus 18 as a function of time, the effect is achieved that the intensity of the manipulating light on the sample also varies as a function of time. In the method described in FIG. 3a, a start is first made with a first manipulating beam focus $18_1$ in an area of the sample 7. The manipulating beam can be used for manipulation (for example, bleaching) at the position $18_1$ of the sample 7. Following this, it is possible—without changing the location of the manipulating beam focus 18—to manipulate with a slightly larger manipulating beam focus $18_2$. A further, even larger manipulating beam focus $18_3$ would then follow next. As a result, the exposed sample area is decreasingly exposed from the inside outward to the manipulating light beam. This can be equated to, for instance, a decrease in the rate of bleaching from the inside outward. Of course modifications such as a switching of the order, that is to say from the outside inward, are possible.

FIG. 3b shows a further embodiment of the change in the manipulating light beam focus 18 on the sample 7. In the embodiment illustrated here, the size of the manipulating light beam focus 18 remains constant. Only the position of the manipulating light beam focus is changed. Here, a first manipulating light beam focus $18_1$ is placed on the sample 7, following that the position of a second manipulating beam focus $18_2$ is placed, and so on. The plurality of manipulating beam foci $18_1, 18_2, \ldots, 18_n$ are in this case placed lined up in such a way, that the areas of the sample which are exposed to a manipulating light beam focus overlap in the edge area in each case.

What is claimed is:

1. A scanning microscope comprising:
  a first light source configured to emit an illuminating light beam which travels along an illuminating beam path;
  a second light source configured to produce a manipulating light beam which travels along a manipulating beam path, the manipulating light-beam having a manipulating beam focus;
  a beam deflection device configured to deflect the illuminating light beam and the manipulating beam focus so as to guide the illuminating light beam and manipulating beam focus over or through a sample; and
  an optical device disposed downstream of the second light source in the manipulating beam path and configured to modify a size of the manipulating beam focus; and
  a control unit connected to the optical device and configured to alter the size of the manipulating beam focus as a function of time.

2. The scanning microscope of claim 1, wherein the optical device includes a zoom optics.

3. The scanning microscope of claim 1, wherein the optical device includes a diaphragm arrangement.

4. The scanning microscope of claim 3, wherein the diaphragm arrangement includes an iris diaphragm.

5. The scanning microscope of claim 1, wherein the beam deflection device is configured to deflect the illuminating light beam and the manipulating beam focus at a first location in the beam deflection device where the illuminating light beam and manipulating light beam coincide.

6. A method for manipulating a sample with a manipulating light beam in a scanning microscope, the method comprising illuminating a sample using a first light source, the first light source emitting an illuminating light beam that travels along an illuminating beam path;

providing a manipulating light beam using a second light source, the manipulating light beam traveling along a manipulating beam path and having a manipulating beam focus;

deflecting the illuminating light beam and the manipulating beam focus so as to guide the illuminating light beam and the manipulating beam focus over or through the sample using the beam deflection device; and controlling an optical device disposed downstream of the second light source in the manipulating beam path using the optical device being controlled by a control unit connected to the optical device so as to alter the size of the manipulating beam focus as a function of time.

7. The method of claim 6, further comprising the step of fixing a position of the manipulating light beam on the sample, wherein the step of controlling the optical device so as to alter the manipulating beam focus includes increasing the size of the manipulating beam focus while performing the step of fixing the position of the manipulating light beam.

8. The method of claim 6, further comprising the step of fixing a position of the manipulating light beam on the sample, wherein the step of controlling the optical device so as to alter the manipulating beam focus includes decreasing the size of the manipulating beam focus while performing the step of fixing the position of the manipulating light beam.

9. The method of claim 6, further comprising the step of altering a position of the manipulating light beam on the sample such that respective positions of the manipulating beam focus at least partly overlap.

10. The method of claim 6, wherein the optical device includes a zoom optics.

11. The method of claim 6, wherein the optical device includes a diaphragm arrangement.

12. The method of claim 6, wherein the illuminating light beam and the manipulating beam focus are at a first location in the beam deflection device where the illuminating light beam and manipulating light beam coincide.

* * * * *